United States Patent [19]

Nikolaus

[11] 4,168,612
[45] Sep. 25, 1979

[54] AUTOMATIC CONTROL SYSTEM FOR A HYDROSTATIC TRANSMISSION

[75] Inventor: Heinrich W. Nikolaus, Hamburg, Fed. Rep. of Germany

[73] Assignee: Sauer Getriebe KG, Neumunster, Fed. Rep. of Germany

[21] Appl. No.: 868,426

[22] Filed: Jan. 10, 1978

[30] Foreign Application Priority Data

Jan. 11, 1977 [DE] Fed. Rep. of Germany ....... 2700803

[51] Int. Cl.² .............................................. F16H 39/46
[52] U.S. Cl. ...................................... 60/431; 60/447;
 60/449; 60/488; 60/494
[58] Field of Search ................. 60/447, 449, 463, 488,
 60/490, 494, 423, 431

[56] References Cited

U.S. PATENT DOCUMENTS

| | | | |
|---|---|---|---|
| 3,214,911 | 11/1965 | Kempson | 60/431 |
| 3,636,705 | 1/1972 | Howard et al. | 60/447 |
| 3,672,161 | 6/1972 | Krusche et al. | 60/420 |
| 3,932,991 | 1/1976 | Clerk | 60/431 |
| 3,932,993 | 1/1976 | Riedhammer | 60/431 |
| 3,986,357 | 10/1976 | Hoffmann | 60/449 X |
| 3,986,358 | 10/1976 | Hoffmann | 60/449 X |
| 4,017,216 | 4/1977 | Moore | 60/423 X |

Primary Examiner—Edgar W. Geoghegan
Attorney, Agent, or Firm—Wegner, Stellman, McCord, Wiles & Wood

[57] ABSTRACT

An automatic control system for a hydrostatic transmission having a control circuit receiving a control flow from a control pump which represents a speed of a prime mover and valve components including a single adjustable valve which creates a delta pressure signal to control the transmission ratio which controls the speed of the prime mover.

25 Claims, 9 Drawing Figures

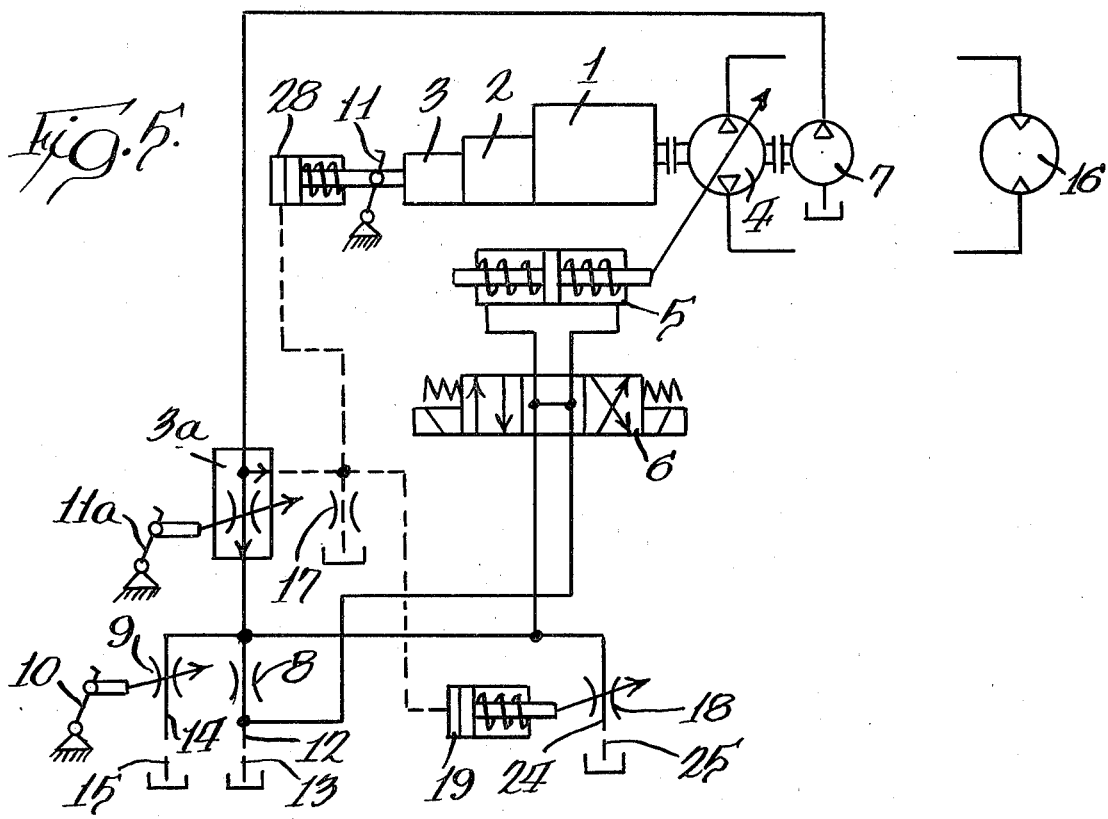
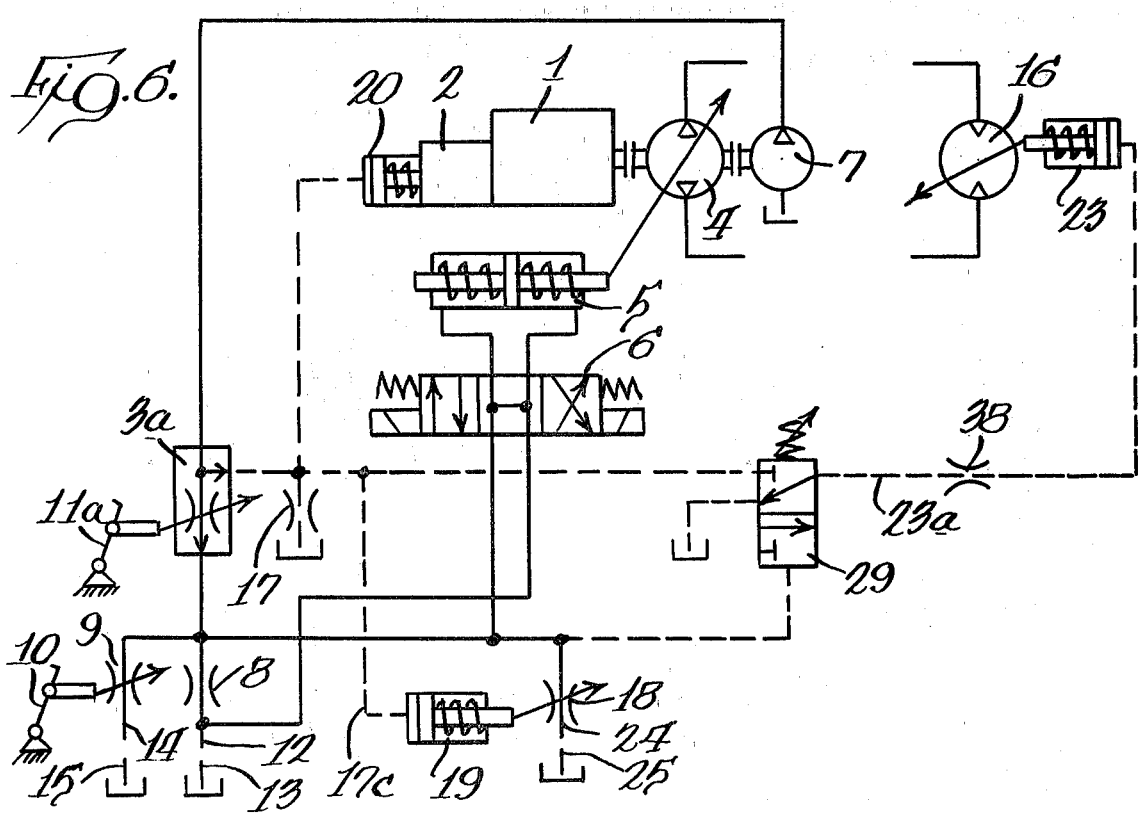

AUTOMATIC CONTROL SYSTEM FOR A HYDROSTATIC TRANSMISSION

BACKGROUND OF THE INVENTION

The invention describes an automatic control system for a hydrostatic transmission, especially as a propulsion system for vehicles, in which the control of the transmission ratio relates to the speed of the prime mover and the sum of loads on the prime mover is automatically matched to the power limit of the prime mover.

Hydrostatic transmissions for vehicles with a control system related to the speed of the prime mover (normally combustion engine) exist in various types. All existing systems are of similar principle, which is described as follows:

Displacement of the pump of the hydrostatic transmission (closed circuit type) is controlled by a hydrostatic cylinder which is actuated by a delta pressure signal. The delta pressure signal is generated using a flow across a fixed throttle. The flow itself is generated by a measuring pump which is running at the speed of the prime mover, or a certain proportion of that speed. The generated delta pressure signal to displace the pump is approximately proportional to the speed squared. The described system gives a certain relation between the speed of the prime mover and the ratio of the hydrostatic transmission.

The operator of the vehicle controls the speed of the prime mover with a pedal.

The described system doesn't provide a control of transmission ratio to cause the combustion engine to operate always in optimum condition, especially an optimum control is impossible, if there are auxiliary systems driven by the same prime mover as the propulsion system. Due to the insufficient control system, the prime mover shows severe variations in speed depending on load; in maximum speed drops to 50% of the rated speed and in extreme situations the engine stalls.

To get a better performance, systems are known, where the orifice of the speed measuring throttle is changed with the position of the prime mover control pedal. This feature changes the proportion between speed of the prime mover and transmission ratio, depending on the position of the control pedal for the prime mover. Other systems use, for instance, the position of an injection pump, in case of a Diesel engine, to influence hydrostatic transmission ratio. Other systems also use a centrifugal force governor to generate a control signal which influences the transmission ratio to reduce engine stall.

The described control systems are insufficient due to the requirements of optimum power control, optimum acceleration control (usage of full prime mover power), and optimum braking performance (defined deceleration).

The described controls become more complicated as they more nearly fulfill the requirements. For advantageous performance in the braking condition of a vehicle, well known systems use a so-called inch-valve (which is used for other purposes, too). Actuation of the inch-pedal reduces the delta pressure signal which controls pump displacement.

SUMMARY OF THE INVENTION

A primary object of the invention is the design of a simple control system which incorporates the advantages of known control systems (combination of prime mover speed and transmission ratio) and avoids the described disadvantages of those systems (problem of power control, of optimum braking, and of complication of a system).

The invention describes purely hydraulic elements which change the basic principle of the control from the previously known operation sequence in which the driver control pedal controls the speed of the prime mover and the speed of the prime mover controls the transmission ratio, to the new sequence wherein the driver control pedal controls the transmission ratio and transmission ratio controls the speed of prime mover.

An important feature of the new system is the fact that the driver's control pedal influences one single control element (control console), which generates the signals to operate all necessary actuators to control the prime mover, hydrostatic pump, optionally, the hydrostatic motor, and the power in the transmission system.

BRIEF DESCRIPTION OF THE DRAWINGS

FIG. 5 is a circuit diagram of a variation of the control according to FIG. 2;

FIG. 6 is an enlarged circuit diagram of the basic principle, which shows in addition the control of the hydrostatic motor;

DESCRIPTION OF THE PREFERRED EMBODIMENT

Figure 1:
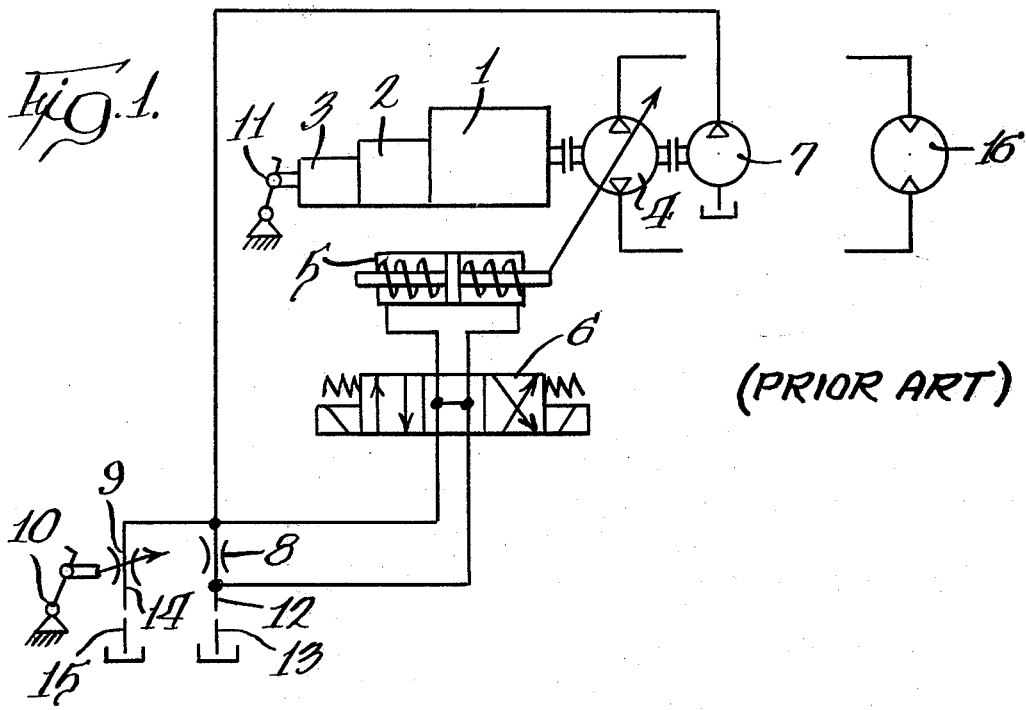
FIG. 1 is a schematic circuit showing the basic principle of an automatic control system for propulsion transmissions, which are known today.

Control systems according to the circuit diagram in FIG. 1 are produced today in at least five different designs.

A variable displacement over centre pump 4 acts with a hydromotor 16, normally in a closed circuit to form a hydrostatic transmission, with an option of the motor being of a variable displacement. The displacement cylinder 5 for the pump is actuated by a delta pressure signal. A directional control valve 6 is used to control the direction of motion of the vehicle. A metering pump 7, driven by the prime mover 1, delivers a flow proportional to the speed of the prime mover. This flow generates, passing the throttle or flow restricting orifice 8, a delta pressure signal, which is used to actuate the cylinder 5. There is approximately a quadratic relation between speed and pump displacement.

Well-known are designs, where the delta pressure signal at throttle 8 is amplified by hydraulic means to get a high level signal actuating displacing cylinder 5. By that means, the pressure signal at throttle 8 can be kept small.

A driver's pedal 11 normally controls the pretension of a spring (=required r p m) at a centrifugal force governor 3 of the combustion engine. The injection pump 2 provides maximum fuel feed for the Diesel engine 1, until the force of the spring of the governor is compensated by the centrifugal forces acting on the governor 3. This control by means of the control pedal of a driver keeps the speed of the Diesel engine at a certain value as long as the motor is not overloaded. Depending on the position of the pedal 11 which sets the required speed of the combustion engine, the flow of pump 7 generates a delta pressure signal across throttle 8, which generates a certain displacement of the pump 4 via cylinder 5. The mechanically or hydraulically operated inch-valve 9 can reduce the delta pressure at the resistance 8 independently of the delivery of the pump 7. As a result, as the main pump reduces displacement, the speed of the motor 16 decreases. The power limiting feature can be improved by adding the actuators 10 and 11, but it is impossible to come to an optimum power control using these types of systems.

The orifice 8 connects to line sections 12 and 13 leading to drain and the inch-valve connects to line sections 14 and 15 leading to drain.

Figure 2:
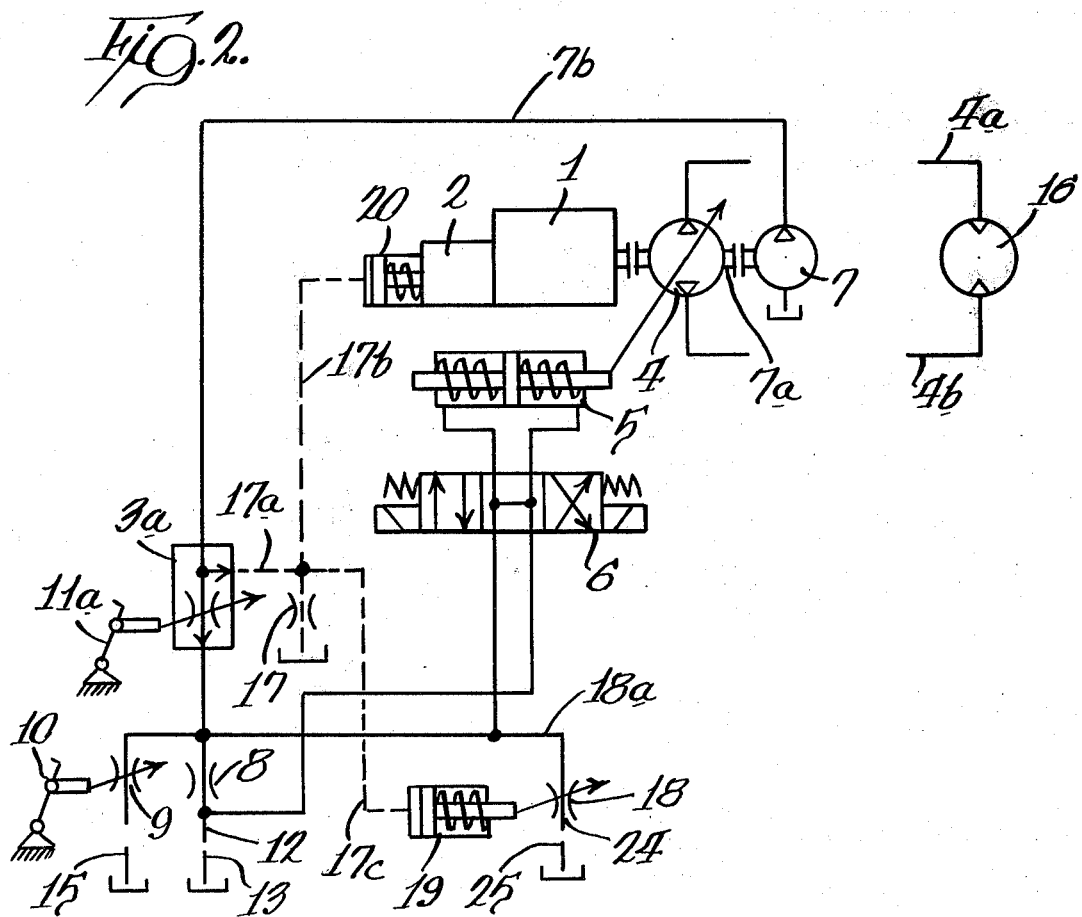
FIG. 2 is a circuit diagram, which shows the basic principle of the invention.

FIG. 2 shows the basic form of the invention with the elements which are the same as those shown in the prior art system of FIG. 1 being given the same reference numeral.

The hydrostatic transmission has the variable displacement unit 4, such as an axial piston pump, connected in closed circuit by lines 4a and 4b, with a displacement unit, such as an axial piston motor 16. The control pump 7 is shown as rotatable with the pump 4 and prime mover 1 by shaft members 7a and delivers a control flow through a line 7b to a three-way control valve 3a. A new driver control pedal 11a is connected to the flow control valve for connecting the rate of flow therethrough to a line 12 having the throttle 8 and which by line section 13 connects to drain. The engine does not have the driver-operated pedal 11, as shown in FIG. 1.

An outlet line 17a from the flow control valve has branch lines 17b and 17c and a drain line with a throttle 17. The branch line 17b leads to a control cylinder 20 having a piston spring-urged in a direction to act against the pressure in branch line 17b. The branch line 17c extends to a cylinder 19 having a piston spring-urged to act against the pressure in the branch line. The cylinder 19 controls an adjustable throttle 18 connected into a line 18a which connects flow control valve 3a and throttle 8. The throttle 18 connects to drain by line sections 24 and 25.

The driver control pedal 11a sets the adjustment of the three-way flow control valve 3a, which in this control system acts as a hydraulic governor (same function as a mechanical centrifugal force governor). The three-way flow control valve 3a can be placed between pump 7 and throttle 8 (as shown in FIG. 2), or between line sections 12 and 13 downstream of throttle 8.

If the control flow of pump 7 (which is proportional to the speed of the Diesel engine 1) exceeds the set flow value, which is set by the position of the pedal 11a, valve 3a bypasses the overshooting flow $\Delta q$ of pump 7 to throttle 17, which flow generates a delta pressure signal (proportional to $\Delta q^2$). This delta pressure (pressure difference) signal actuates the actuating piston of the cylinder 20 which displaces the injection pump from maximum fuel feed (where it stands before the actuator starts to work by a pretension of the spring) to a smaller fuel feed, and in that way reduces the rpm of the Diesel engine 1 to the speed which is required by the set of the valve 3a, and the pedal 11a. The delta pressure signal at throttle 17 acts in addition on the cylinder 19, which with increasing delta pressure signal closes the orifice of throttle 18 of a power limiting valve. If the Diesel engine is going to be overloaded, this can be a load caused by the propulsion system, or a load caused by any other system which is driven in addition by the Diesel engine, then the Diesel engine speed becomes lower than the speed which is required by the setting of pedal 11a. As a result of the difference between set speed and actual speed, the bypass flow across throttle 17 decreases, and, according to this, the delta pressure signal at throttle 17 decreases. First reaction of the control system is to increase fuel feed to the Diesel engine by action of cylinder 20. When the maximum fuel feed is reached, then cylinder 19 starts to open the orifice of valve 18; this lowers the delta pressure signal at the throttle 8 (this is an automatic inch function). By this means, the displacement of pump 4 is reduced and the power of the hydro-motor 16 is matched to the available power of Diesel engine 1. This provides a power limiting control system.

The function of throttle 8 in FIG. 2 is the same in the system, as that shown in FIG. 1. In both systems, the throttle 8 controls the relation between prime mover speed and displacement of the pump. The new system, shown in FIG. 2, normally would not need an inch throttle 9, 10 for braking, but in many applications this inch valve is incorporated for other purposes and it can be used for braking, too.

The elements 3a, 9, 8, 10, 11a, 17, 18, 19, and the element 6 can be combined in one control block by design. The throttles 8, 9, and 18 can be combined in one element, also.

By adjustment of throttle orifice of throttle 17, the speed drop of the Diesel engine 1 can be adjusted very accurately.

The simultaneous operation of fuel feed for the Diesel engine 1, and of the power limiting valve 18 by the delta pressure signal at throttle 17 gives unlimited freedom for the design of the characteristics of the propulsion system (displacement of pump 4, orifice of throttle 8, displacement characteristic of cylinder 5).

Figure 3:
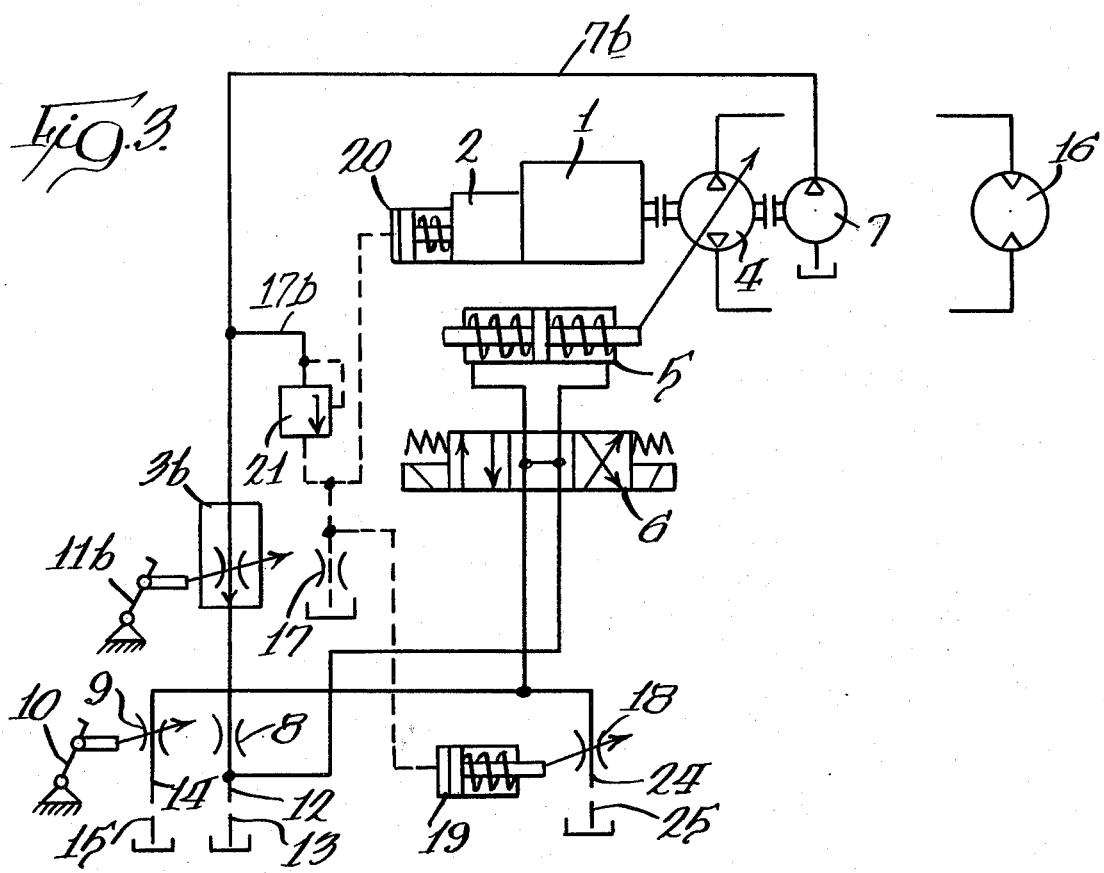
FIG. 3 is a circuit diagram of a possible variation of FIG. 2.

FIG. 3 relates to another embodiment of the invention and shows, that the control signal for cylinders 19, and 20 can be generated as well by using an adjustable two-way flow control valve 3b with a pressure relief valve 21 connected into line 17b, together with the throttle 17 downstream thereof, being in parallel with the flow control valve 3b. The control of the propulsion system is done by the pedal 11b acting on the flow control valve 3b.

Figure 4:
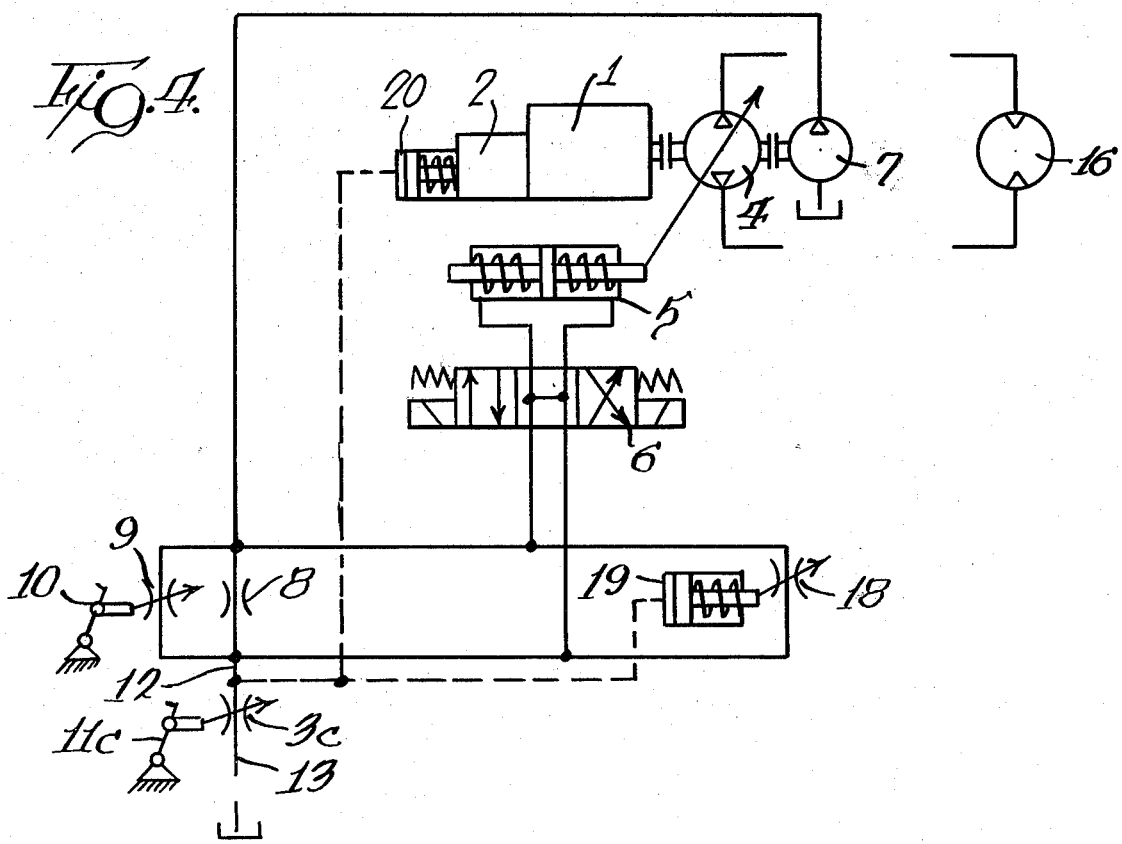
FIG. 4 is a circuit diagram of another variation according to FIG. 2.

FIG. 4 shows another embodiment of the basic idea of the invention, i.e., to generate a pressure signal to control the combustion engine 1 and displacement of pump 4 by use of a hydraulic flow limiting device. This is accomplished by an adjustable throttle 3c, actuated by a pedal 11c. The cylinders 20 and 19 react on a certain pressure signal, the level of the signal is given by the position of pedal 11c, and delivery of pump 7.

FIG. 5 illustrates another embodiment wherein the delta pressure signal at throttle 17 can also be used to actuate the prior art lever 11 of the centrifugal force governor (FIG. 1), using a cylinder responsive to the signal.

The circuit diagram in FIG. 6 shows an extension of the basic idea of the invention disclosed in FIG. 2. A displacement control 23 of the variable displacement hydromotor 16 is controlled by the delta pressure signal at throttle 17 (the motor may increase displacement with increasing pressure signal) through a line 23a. This system includes the variable displacement motor 16 in the power limiting regulation system and it fulfills the basic idea that only one control signal influences all actuators to control the position and performance of the different members of the transmission system (prime mover, hydro pump 4, hydro-motor 16). It may be required that the hydro-motor 16 not reduce its displacement from maximum when the Diesel engine 1 is working at low speed (this gives maximum tractive force at low speeds of prime mover). To achieve this performance, a valve 29 interrupts flow in the line 23a to displacement cylinder 23, when the delta pressure signal at throttle 8 is low. A control orifice 38 is positioned in line 23a.

Figure 7:
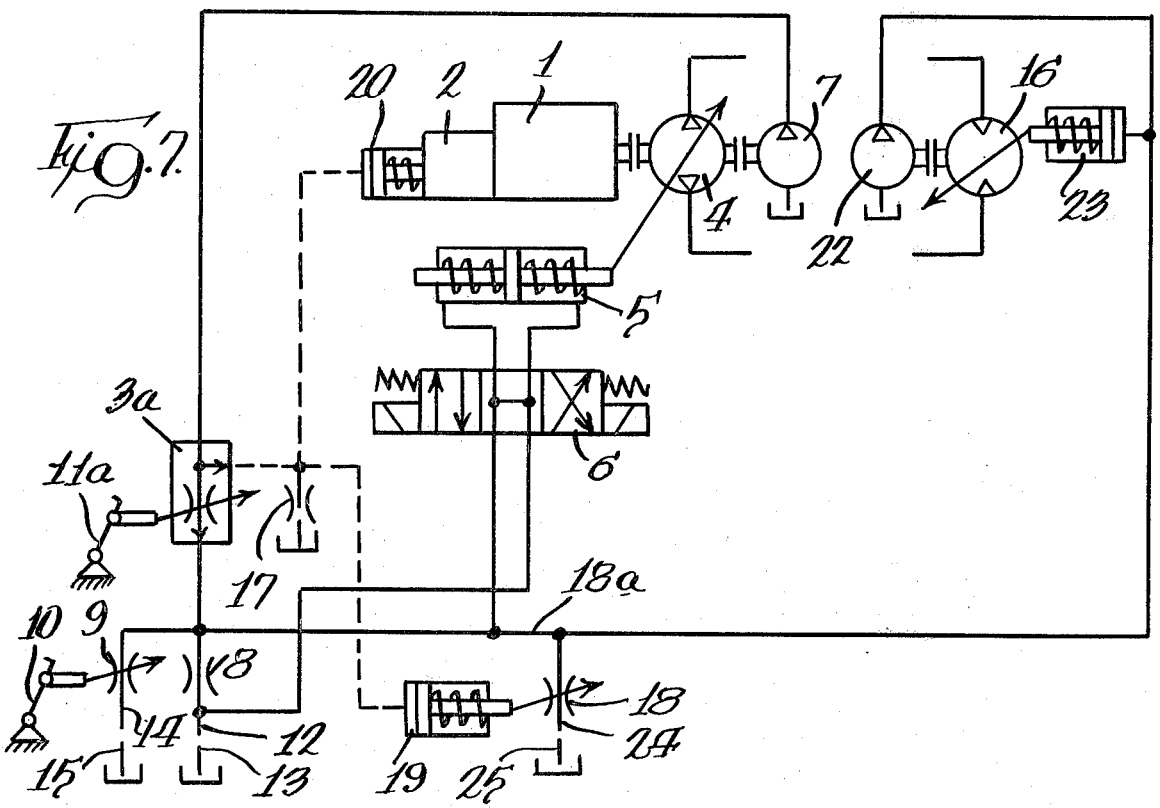
FIG. 7 is a circuit diagram of the integration of an optional motor control into the principle of the invention.

FIG. 7 illustrates another embodiment wherein the cylinder 23 can be controlled directly by the delta pressure signal at throttle 8. The performance of a control of this type, which is already known, can be improved by use of an additional control flow pump 22, which is connected to the hydro-motor 16. This pump 22 delivers an additional flow to the flow of pump 7, and both flows pass through the throttle 8. The use of both control flows allows a very accurate adjustment of the control system with control of both pump and motor displacement.

Figure 8:
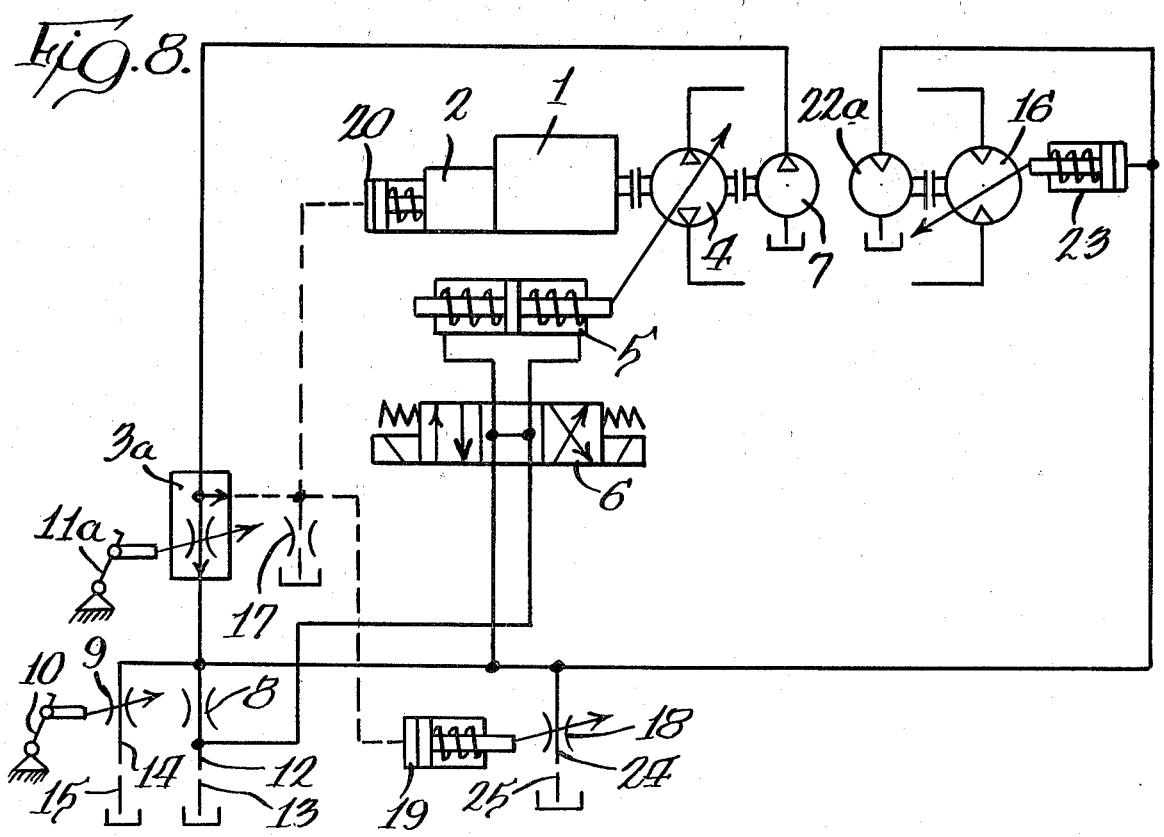
FIG. 8 is a circuit diagram of an alternative solution to the circuit of FIG. 7.

FIG. 8 shows an alternate version of FIG. 7 wherein a control motor 22a replaces the control pump 22 and subtracts from the flow of pump 7 prior to its flow passing through the throttle 8.

Figure 9:
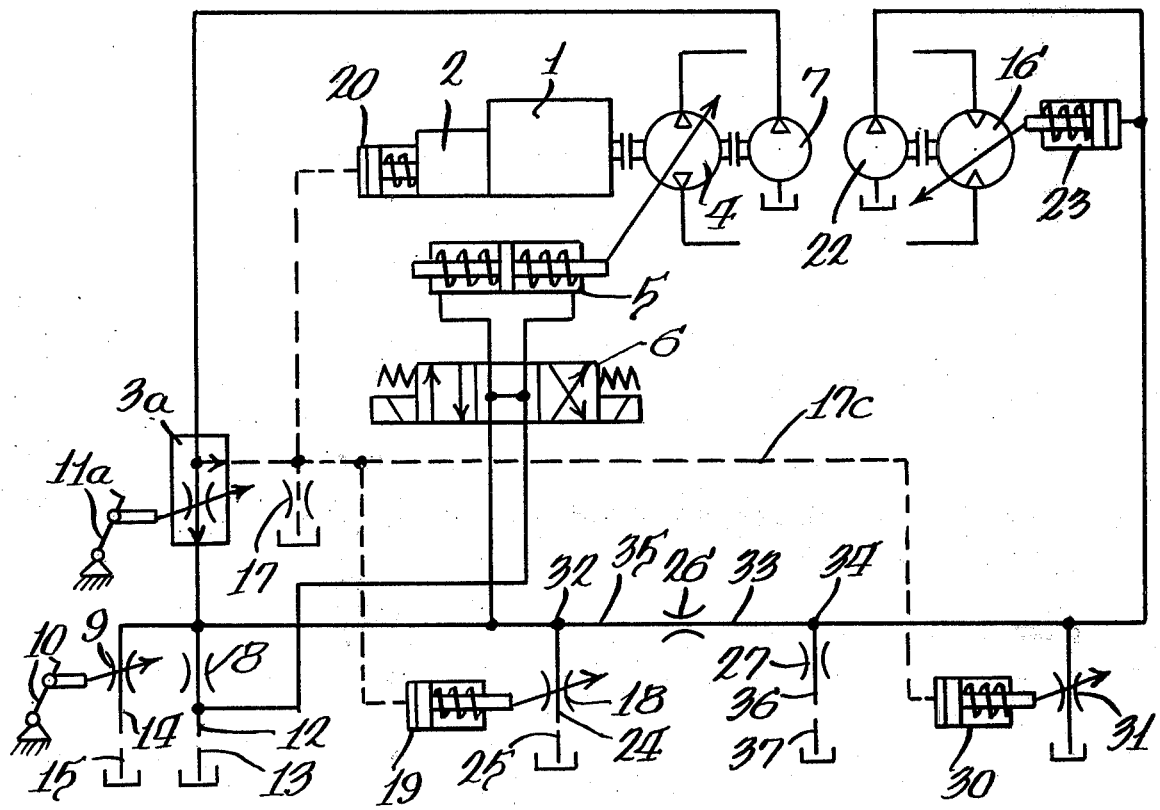
FIG. 9 is a circuit diagram of an alternative solution to the circuit of FIG. 8.

A separate control for pump displacement and motor displacement is shown in FIG. 9. The displacement signal for motor cylinder 23 is generated by the control pump 22 and the delta pressure signal at the throttle 27. A separate adjustable power limiting valve 31 for the hydro-motor 16 is positioned by the delta pressure signal at throttle 17, using a cylinder 30. A junction between the two regulation systems for pump and motor (which normally stabilizes the operation) can be done by the pipes 35, 32, 33, 34, using in addition an orifice 26 which, optionally may be adjustable. If this is done, it may be possible to omit one of the two power limiting valves 18, 19, or 30, 31.

Finally, it must be mentioned, that all circuits, which show the basic idea of the invention (FIG. 2 to FIG. 9), can be operated without the throttles 8 and 27, as systems to control a speed, or a power. In that case, the flow control valves 3a, 3b, 3c would be placed in the charge flow or discharge flow line of the closed circuit. In that case, it would be necessary to generate by external means the delta pressure signal, which is necessary to control displacement of the pump 4, which in addition is needed at the power limiting valve 18, 19.

Instead of the control throttle 3c, 11c in FIG. 4, it is possible to install between lines 12 and 13 a two-way valve 3b, 11b or a three-way flow control valve 3a, 11a having a throttle 17 in parallel therewith.

The use of a hydraulically operated valve 6a to control direction of vehicle motion instead of an electrical operated valve 6 allows use of this valve 6a as a power limiting valve, too, controlled by the delta pressure signal at the throttle 17.

I claim:

1. An hydrostatic transmission, especially a hydrostatic propulsion transmission for a vehicle, in which the flow or part of the flow of a control pump is used to charge the closed transmission circuit, and/or to influence the transmission ratio, the control pump running at the speed of a main pump (4) for the transmission, or with a speed proportional to the speed of the main pump, a control circuit connected to said control pump, an orifice (8) in said control circuit through which the flow of the control pump or a part of it flows and generates a delta pressure signal which is used to control the transmission ratio related to the speed of said main pump (4), the control flow of the control pump (7) or a part of it is passed through an adjustable flow control valve (3a,3b) in said control circuit and which is set by a mechanical signal (11a,11b), whereby if the flow of the control pump exceeds the setting of the flow control valve, the excess flow generates a delta pressure signal, which is used to control the fuel feed of a prime mover (1), and/or to control the actuator, which controls displacement of the main pump (4), and/or to control the displacement control (23) of a hydromotor (16).

2. An hydrostatic transmission, as defined in claim 1, with the characteristic that the adjustable flow control valve in said control circuit may be either a 2-way flow control valve (3b) with an optional pressure relief or throttle valve (21) in parallel thereto and an orifice (17) downstream of the throttle valve, or a 3-way flow control valve with an orifice (17) in bypass.

3. An hydrostatic transmission, as defined in claim 1, with the characteristic that instead of the flow control valve (3a,3b) an adjustable throttle, adjusted by a lever (11c), can be used in said control circuit.

4. An hydrostatic transmission, as defined in claim 1, with the characteristic that said delta pressure signal, which acts on the prime mover (1), can be used for direct control (20) of the fuel feed, or as well to displace a pedal (11), which sets the speed of the prime mover (1).

5. An hydrostatic transmission, as defined in claim 1 with the characteristic that the delta pressure signal, generated by the excess flow use of the flow control valve (3a,3b) and the orifice (17), or the throttle (3c), is transmitted through a switching valve (29) to the displacement cylinder (23) of the hydro-motor (16), which valve (29) closes and opens according to a delta pressure signal at orifice (8) to connect or disconnect the delta pressure signal from displacement cylinder (23).

6. An hydrostatic transmission, as defined in claim 1 with the characteristic that the delta pressure signal at throttle (8) is used in addition to control the displacement control (23) of a motor of the transmission.

7. An hydrostatic transmission, as defined in claim 6, with the characteristic that either a metering pump (22) or a metering motor (22a) is driven by the transmission motor, and that a fluid line therefrom is connected to the high pressure side of the orifice (8).

8. An hydrostatic transmission, as defined in claim 1 with the characteristic that a metering pump (22) driven by the transmission motor (16), delivers the flow across a throttle (27) and the delta pressure signal at throttle (27) is used to operate the displacement control (23) of the transmission motor (16).

9. An hydrostatic transmission, as defined in claim 8, with the characteristic that the delta pressure signal at throttle (8), which is used to control the pump displacement (5) and the delta pressure signal at throttle (27), which is used to control the displacement control (23), are connected via a line and an orifice (38) within that line.

10. An hydrostatic transmission, as defined in claim 1, with the characteristic that the delta pressure signal to control the displacement control (5) of the transmission pump acts on a cylinder (19), which closes the orifice of a throttle (18), and interrupts the excess bypass flow parallel to throttle (8).

11. An hydrostatic transmission, as defined in claim 9, with the characteristic that the delta pressure signal to control the displacement (23) of the transmission motor (16) acts on a cylinder (30), which closes the orifice of a throttle (31), and interrupts by that way the bypass flow parallel to throttle (27).

12. An hydrostatic transmission, as defined in claim 11, including a hydraulically operated directional valve (6), which is used to control the direction of motion of a vehicle, can additionally perform the function of the cylinder (19) and the throttle (31).

13. A hydrostatic transmission usable with a prime mover and having a pair of hydraulically interconnected displacement units with one of said units being of variable displacement, a control pump operable to deliver a control flow related to the speed of the variable displacement unit, displacement control means for controlling the displacement of the variable displacement unit, a fluid circuit to receive said control flow and including means to provide a variable pressure difference signal applied to said displacement control means, said circuit additionally having means including a flow restrictor operable when the control flow exceeds a predetermined amount to divert the flow in excess of said predetermined amount and provide an additional control signal, fuel control means for said prime mover, and means responsive to said additional control signal for controlling the fuel supply to the prime mover and said variable pressure difference signal.

14. A transmission as defined in claim 13 wherein said flow restrictor is an adjustable flow control valve to vary the flow rate therethrough and has an outlet for flow above said predetermined amount, and a flow line connected to said outlet and extending to said fuel control means and including a drain branch with an orifice.

15. A transmission as defined in claim 13 wherein said flow restrictor is an adjustable throttle.

16. A transmission as defined in claim 13 wherein a flow line from the flow restrictor includes a power limiter valve to affect said variable pressure difference signal whereby the displacement of the variable displacement unit is modified when the additional control signal exceeds a certain value.

17. A transmission as defined in claim 13 wherein the other of said units is of the variable displacement type with displacement control means responsive to said pressure difference signal, and a switching valve connected in said circuit and operable in response to said pressure difference signal to control the application of the pressure difference signal to the last-mentioned displacement control means.

18. A transmission as defined in claim 13 wherein the other of said units is of the variable displacement type with displacement control means responsive to said pressure difference signal, and a second control pump for providing a control flow to said circuit upstream of said pressure difference signal means which is representative of the speed of the other of said units.

19. A transmission as defined in claim 18 including a throttle in said circuit which coacts with the flow from the second control pump to operate the displacement control means of said other unit.

20. A transmission as defined in claim 13 wherein the other of said units is of the variable displacement type with displacement control means responsive to said pressure difference signal, and a control motor connected in said circuit upstream of said pressure difference signal means and which operates at the speed of the other of said units.

21. A hydrostatic transmission usable with a prime mover having fuel control means comprising, a pair of hydraulically interconnected displacement units with one of said units being of variable displacement, displacement control means for controlling the displacement of the variable displacement unit, a control circuit, a control pump operable to deliver a control flow to said control circuit with said control flow being related to the speed of the prime mover, first means in said control circuit operable to derive a variable pressure difference signal from said control flow and apply said pressure difference signal to said displacement control means, and operator controlled second means in said control circuit for creating a control signal related to control flow for controlling said fuel control means for the prime mover and said first means.

22. A hydrostatic transmission as defined in claim 21 wherein both of said displacement units are of variable displacement and have displacement control means, and said first means in the control circuit applying said pressure difference signal to the displacement control means for both units.

23. A hydrostatic transmission as defined in claim 21 wherein said fuel control means includes means for urging thereof toward a maximum fuel supply position and said control signal acts in opposition to the urging means.

24. A hydrostatic transmission as defined in claim 21 wherein said second means includes an adjustable three-way flow control valve with an outlet line for control flow in excess of an operator setting, and said outlet line is extended to the fuel control means and having an orificed branch to drain.

25. A hydrostatic transmission as defined in claim 21 wherein said second means includes an adjustable two-way flow control valve, a control circuit branch upstream of said flow control valve, a pressure relief valve in said branch, and said control circuit branch extending to said fuel control means and having an orificed connection to drain.

* * * * *